United States Patent
Thiebot et al.

(10) Patent No.: US 9,977,889 B2
(45) Date of Patent: May 22, 2018

(54) DEVICE FOR CHECKING THE AUTHENTICITY OF A FINGERPRINT

(71) Applicant: MORPHO, Issy les Moulineaux (FR)

(72) Inventors: Alain Thiebot, Issy les Moulineaux (FR); Joël-Yann Fourre, Issy les Moulineaux (FR)

(73) Assignee: MORPHO, Issy les Moulineaux (FR)

( * ) Notice: Subject to any disclaimer, the term of this patent is extended or adjusted under 35 U.S.C. 154(b) by 0 days. days.

(21) Appl. No.: 15/077,294

(22) Filed: Mar. 22, 2016

(65) Prior Publication Data
US 2016/0283705 A1    Sep. 29, 2016

(30) Foreign Application Priority Data

Mar. 23, 2015   (FR) ...................................... 15 52356

(51) Int. Cl.
*G06K 9/00* (2006.01)
*G06F 21/32* (2013.01)

(52) U.S. Cl.
CPC ......... *G06F 21/32* (2013.01); *G06K 9/00033* (2013.01); *G06K 9/00087* (2013.01); *G06K 9/00107* (2013.01); *G06K 9/00114* (2013.01); *G06K 9/00201* (2013.01)

(58) Field of Classification Search
USPC ............. 283/68; 382/115, 116, 124; 713/182
See application file for complete search history.

(56) References Cited

U.S. PATENT DOCUMENTS

| | | | | |
|---|---|---|---|---|
| 5,901,239 A * | 5/1999 | Kamei | ............... | G06K 9/00067 382/124 |
| 6,233,348 B1 * | 5/2001 | Fujii | .................. | G06K 9/00067 382/125 |
| 7,079,672 B2 * | 7/2006 | Matsumoto | ........ | G06K 9/00006 340/5.83 |
| 7,577,276 B2 * | 8/2009 | Ando | ................. | G06K 9/00087 283/68 |
| 7,609,865 B2 * | 10/2009 | Chen | .................. | G06K 9/00033 382/124 |
| 7,685,432 B2 * | 3/2010 | Mochizuki | ............... | G06K 9/00 713/182 |
| 8,472,679 B2 * | 6/2013 | Abiko | .................... | G06K 9/036 382/115 |

(Continued)

OTHER PUBLICATIONS

Kücken et al; "Fingerprint Formation;" Journal of Theoretical Biology; 2005; vol. 235; pp. 71-83.

(Continued)

*Primary Examiner* — Xuemei Chen
(74) *Attorney, Agent, or Firm* — Oliff PLC; R. Brian Drozd

(57) ABSTRACT

Disclosed is a checking device that is intended to check the authenticity of a fingerprint of a finger and which includes, among other things, a capture system for capturing an image of the finger and of the fingerprint, and acquisition means for acquiring a three-dimensional model of the finger. The checking device also includes means for determining the core on the image of the fingerprint, for locating the crown of the three-dimensional model, for determining the orientation and position of the end of the finger and for determining the relative positions of the end, the crown and the core. From these elements, the checking device can decide whether the fingerprint is real or false.

5 Claims, 2 Drawing Sheets

(56) References Cited

U.S. PATENT DOCUMENTS

Figure 3:
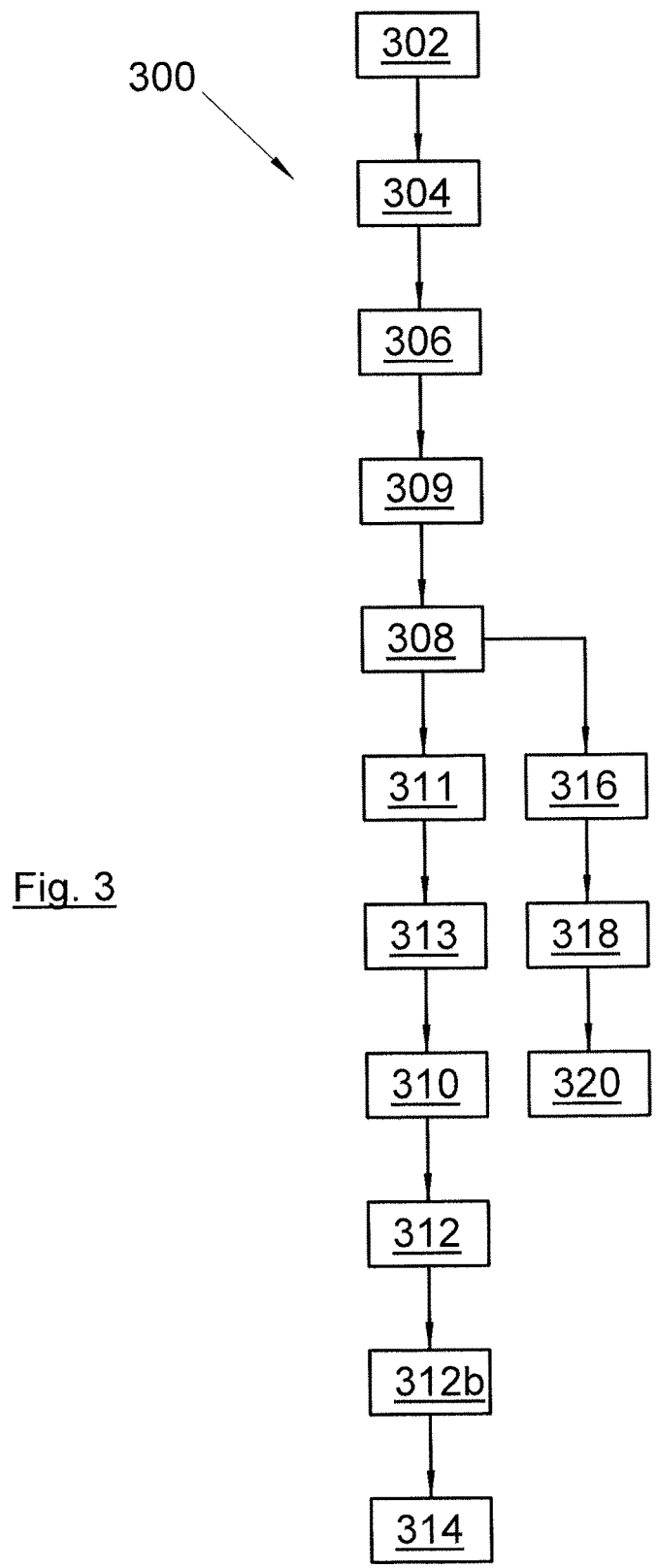

| | | | | |
|---|---|---|---|---|
| 8,699,763 B2* | 4/2014 | Nada | ............... | G06K 9/00087 382/116 |
| 8,953,854 B2* | 2/2015 | Kumar | ............... | G06K 9/00087 382/124 |
| 9,098,756 B2* | 8/2015 | Endoh | ............... | G06K 9/00013 |
| 9,122,902 B2* | 9/2015 | Kamakura | ......... | G06K 9/00067 |
| 9,298,996 B2* | 3/2016 | Nada | ............... | G06K 9/00006 |
| 9,323,976 B2* | 4/2016 | Picard | ............... | G06K 9/00107 |
| 9,325,707 B2* | 4/2016 | Ketchantang | ...... | G06K 9/00885 |
| 9,471,827 B2* | 10/2016 | Thiebot | ............... | G06K 9/00013 |
| 9,489,561 B2* | 11/2016 | Feng | ............... | G06K 9/001 |
| 9,560,042 B2* | 1/2017 | Okazaki | ............... | G06F 1/1616 |
| 2004/0161135 A1* | 8/2004 | Sano | ............... | G06K 9/00087 382/124 |
| 2006/0034497 A1* | 2/2006 | Manansala | ............ | G06K 9/001 382/124 |
| 2006/0067566 A1* | 3/2006 | Hara | ............... | G06K 9/00067 382/124 |
| 2006/0120576 A1 | 6/2006 | Chen | | |
| 2008/0013803 A1* | 1/2008 | Lo | ............... | G06K 9/00067 382/124 |
| 2014/0049373 A1 | 2/2014 | Troy et al. | | |
| 2016/0275335 A1* | 9/2016 | Besson | ............. | G06K 9/00906 |

OTHER PUBLICATIONS

Bronstein et al; "High-Resolution Structured Light Range Scanner with Automatic Calibration;" Aug. 4, 2003; pp. 1-26.

Translation of "Curve;" https://fr.wikipedia/org/wiki/Courbure; accessed May 26, 2016.

Johal et al; "A Novel Method for Fingerprint Core Point Detection;" International Journal of Scientific & Engineering Research; Apr. 2011; vol. 2; Issue 4; pp. 1-6.

Zhang et al; "Singular Point Dectection in Fingerprint Image;" The 5th Asian Conference on Computer Vision; Jan. 23-25, 2002; Melbourne, Australia; pp. 1-4.

Nguyen et al; "Epidermal Ridges: Positional Information Coded in an Orientational Field;" Thining in Patterns—Fractals and Realted Phenomena in Nature; Jan. 1, 2004; XP055240297; pp. 279-290.

Kumar et al; "Towards Contactless, Low-Cost and Accurate 3D Fingerprint Identification;" IEEE Conference on Computer Vision and Pattern Recognition; Jun. 23, 2013; XP032492972; pp. 3438-3443.

Jan. 12, 2016 Search Report issued in French Patent Application No. 1552356.

* cited by examiner

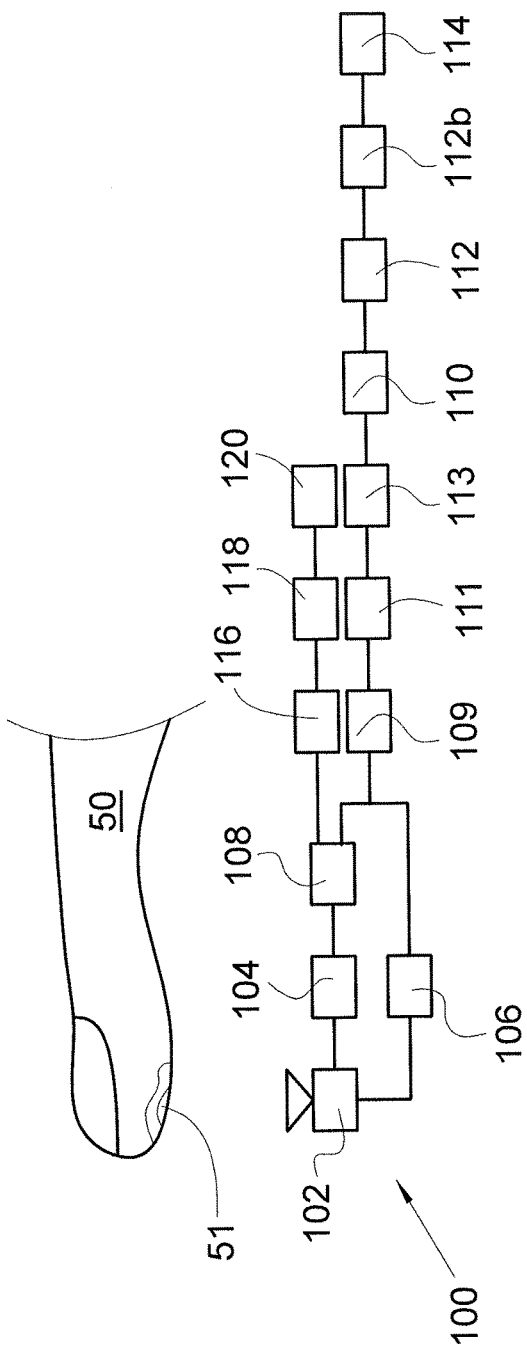
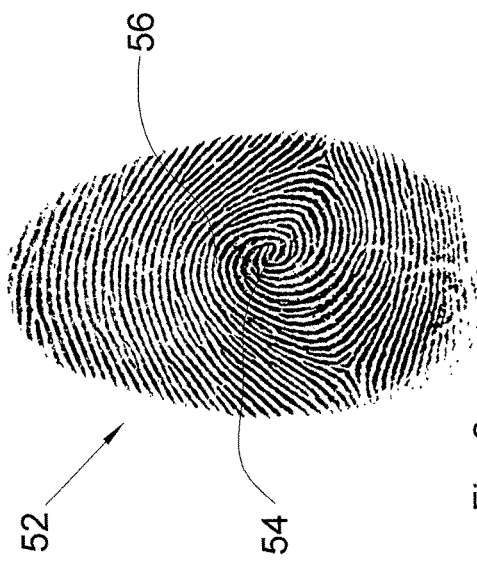
Fig. 1
Fig. 2

DEVICE FOR CHECKING THE AUTHENTICITY OF A FINGERPRINT

The present invention relates to a device for checking the authenticity of a fingerprint and a method for checking the authenticity of a fingerprint implemented by such a checking device. It finds an application in the field of biometric recognition by analysing fingerprints of a person.

Capturing a bidimensional image of a fingerprint and comparing this image with a set of reference images in a database of authorised persons is known.

Constructing a three-dimensional (3D) model of the fingerprint and of the finger from a plurality of simultaneously captured images is also known. The document US-A-2006/120576 discloses a device for making such a construction. It is then possible to compare the model thus constructed with reference models in a database of authorised persons.

In the context of a three-dimensional construction, the images are captured without contact, that is to say without there being any contact between the finger and a support, in order to prevent deformation of the finger causing deformation of the fingerprint.

Some ill-intentioned individuals succeed in reproducing the fingerprint of the finger of an authorised person by making a reproduction of the fingerprint, among other things on a film. Such an individual can then stick the film to his own finger in order to foil the security.

One object of the present invention is to propose a device for checking the authenticity of a fingerprint that does not have the drawbacks of the prior art and in particular makes it possible to check that the fingerprint that is presented does actually correspond to the finger carrying it.

To this end, a checking device intended to check the authenticity of a fingerprint of a finger of a person is proposed, the checking device comprising:
- a capture system intended to capture without contact at least one image of said finger and of said fingerprint,
- acquisition means intended to acquire without contact a three-dimensional model of the finger,
- determination means intended to determine the core on the image of the fingerprint,
- orientation means intended to determine the orientation and position of the end of said finger,
- location means intended to locate the crown of the three-dimensional model,
- position means intended to determine the relative positions of said end, said crown and said core,
- first checking means intended to check that the relative positions of the core, of the crown and of the end of the finger thus determined are in accordance with those expected,
- calculation means intended to calculate the distance between the crown of the three-dimensional model thus located and the core thus determined,
- second checking means intended to check that the distance between the crown and the core thus calculated is in a first predefined range, and
- first decision-taking means intended to take a decision as to the authenticity of the fingerprint from information transmitted by the first checking means and the second checking means.

Advantageously, the calculation means are also intended to calculate the distance between the end of the finger and the core and the ratio of the distance between the end of the finger and the core on the distance between the crown and the core, and the checking device comprises also third checking means intended to check that the ratio thus calculated is in a second predefined range, and the first decision-taking means are intended to take a decision as to the authenticity of the fingerprint from information also transmitted by the third checking means.

Advantageously, the checking device further comprises:
- prediction means intended to determine a zone liable to contain said crown from the position of the core determined by the determination means,
- test means intended to calculate the curvature of said zone and to test whether this curvature is in a third predefined range, where the curvature of said zone is the average on the zone of the average curvature of the surface of the finger,
- second decision-taking means intended to take a decision as to the authenticity of the fingerprint from information transmitted by the test means.

The invention also proposes a checking method implemented by the checking device of the above variants and comprising:
- a capture step during which the capture system captures without contact at least one image of said finger and of said fingerprint,
- a construction step during which the acquisition means acquire without contact a three-dimensional model of the finger,
- a determination step during which the determination means determine the core on the image of the fingerprint,
- an orientation step during which the orientation means determine the orientation and position of the end of said finger,
- a location step during which the location means locate the crown of the three-dimensional model,
- a position step during which the position means determine the relative positions of said end, said crown and said core,
- a first checking step during which the first checking means check that the relative positions thus determined are in accordance with those expected,
- a calculation step during which the calculation means calculate the distance between the crown of the three-dimensional model thus located and the core thus determined and the distance between the end of the finger and the core and the ratio of the distance between the end of the finger and the core on the distance between the crown and the core,
- a second checking step during which the second checking means check that the distance between the crown and the core thus calculated is in the first predefined range,
- a third checking step during which the third checking means check that the ratio thus calculated is in the second predefined range, and
- a first decision-taking step during which the first decision-taking means take a decision as to the authenticity of the fingerprint from information transmitted by the first checking means, the second checking means and the third checking means after respectively the first checking step, the second checking step and the third checking step.

Advantageously, the checking method further comprises:
- a prediction step during which the prediction means determine the zone liable to contain said crown from the position of the core determined by the determination means and the orientation of the finger determined by the orientation means, a test step during which the test means calculate the curvature of said zone and test whether this curvature is in the third predefined range, and a second decision-taking step during which the second decision-taking means take a decision as to the authenticity of the fingerprint from information transmitted by the test means after the test step.

The features of the invention mentioned above, as well as others, will emerge more clearly from a reading of the following description of an example embodiment, said description being given in relation to the accompanying drawings, among which:

FIG. 1 is a schematic representation of a device for checking the authenticity of a fingerprint of a person according to the invention, and FIG. 2 depicts an image of fingerprint, and FIG. 3 depicts an algorithm of a method for checking the authenticity of a fingerprint of a person according to the invention.

FIG. 1 depicts a checking device 100 intended to check the authenticity of a fingerprint 51 of the finger 50 of a person.

FIG. 2 is an example of an image 52 of a fingerprint 51. The image 52 shows valleys and ridges as well as a particular point 54 referred to as the core of the fingerprint 51 and which corresponds to the centre of curvature of the fingerprint 51.

The core 54 is situated at the point of attachment of a nerve attached to the last phalanx.

The internal face of the last phalanx of the finger 50 has at least one local dome, the crown 56 of which is situated between 1 and 3 mm from the core 54 towards the end of the finger 50.

The end of the finger 50, the crown 56 and the core 54 are globally aligned and the core 54 cannot be offset on the side of the finger 50.

In addition, the crown 56 and the core 54 are located very near of the centre of the last phalanx, in a circle centred on the centre of the phalanx and with a radius of maximum 6 mm.

The dimension of the last phalanx can be obtained by measuring the distance projected to the surface between the end of the finger 50 and the basal lines (first folds orthogonal to the axis of the finger 50 projected on surface). However, the basal lines are not always visible in the acquired image. We can only verified that, the crown and the core being enough closed to each other and relatively centred on the last phalanx, the core and the crown are closer to each other than the core and the end of the finger, in a ratio between two and seven.

The principle of the invention consists of checking that the core 54 and the crown 56 of the dome of the phalanx and the end of the finger satisfy the previously defined relative positions.

If the core 54 is indeed placed recessed from the crown 56 of the dome with respect to the end of the finger 50 and that these three elements are relatively well aligned and that the distance between the core 54 and the crown 56 is in a first range and that the ratio of the distance between the ned of the finger 50 and the core 54 on the distance between the crown 56 and the core 54 is in a second range, they will be considered to satisfy the authenticity criteria and the finger 50 and the fingerprint 51 will be considered to be real.

Typically, the first range is between 0.5 and 3.5 mm, and more precisely between 1 and 3 mm.

Typically, the tolerance on the defect of alignment in the image of imprint is 5° maximum between two of three lines passing between the points in pairs among the crown 56, the end and the core 54.

Typically, the second range is between 2 and 7

If the core 54 is not placed recessed from the crown 56 of the dome with respect to the end of the finger 50 or at a distance that is not in said first range, or if the end of the finger 50, the crown 56 and the core 54 are not enough aligned, or if the core 54 is not far enough away from the end of the finger 50 compared to its distance to the crown 56, they will be considered not to satisfy the authenticity criteria and the finger 50 and the fingerprint 51 will be considered to be false. The inconsistency between the expected position of the end of the finger 50, the crown 56 and the core 54 results from the faulty positioning of a film and therefore of the core 54 on the finger 50 during an attempt at fraud.

In the case of frauds fabricated from a moulding of a real finger, it is almost routine for the dome to be flattened when the finger is pressed in the moulding material, causing a hollow in place of the dome on the final fraud.

The checking device 100 comprises:
- a capture system 102 intended to capture without contact at least one image of said finger 50 and of said fingerprint 51,
- acquisition means 104 intended to acquire without contact a three-dimensional model of the finger 50,
- determination means 106 intended to determine the core 54 on the image 52 of the fingerprint 51,
- orientation means 109 intended to determine the orientation and position of the end of said finger 50 from the captured images or from the three-dimensional model,
- location means 108 intended to locate the crown 56 of the three-dimensional model,
- positioning means 111 intended to determine the relative positions of said end, said crown 56 and said core 54,
- first checking means 113 intended to check that the relative positions of the core 54, of the crown 56 and of the end of the finger 50 thus determined are in accordance with those expected,
- calculation means 110 intended to calculate the distance between the crown 56 of the three-dimensional model thus located and the core 54 thus determined,
- second checking means 112 intended to check that the distance between the crown 56 and the core 54 thus calculated is in a first predefined range, and
- first decision-taking means 114 intended to take a decision as to the authenticity of the fingerprint 51 from information transmitted by the first checking means 113 and the second checking means 112.

The checking device 100 thus makes it possible to check agreement of the positions, included the alignment, between the end of the finger 50, the crown 56 and the core 54 as well as the agreement in distance between the crown 56 of the dome of the phalanx and the core 54 of the fingerprint 51, and the fact that the crown 56 and the core 544 ate relatively close to each other et relatively far away from the end of the finger 50 and therefore to deduce therefrom the authenticity of the fingerprint 51 thus presented.

To improve the check, the calculation means 110 are also intended to calculate the distance between the end of the finger and the core 54 and the ratio of the distance between the end of the finger 50 and the core 54 on the distance between the crown 56 and the core 54. The checking device 100 comprises also third checking means 112b intended to check that the ratio thus calculated is in a second predefined range, and the first decision-taking means 114 are intended to take a decision as to the authenticity of the fingerprint 51 from information also transmitted by the third checking means 112*b*.

The orientation means 109 rely for example on the determination of the moment of inertia of the three-dimensional model of the finger in order to find the axis of the finger 50. Another solution consists of making a finger model correspond to the three-dimension model acquired by approximating for example the form of a finger by a cylinder with a sphere with the same radius at the end.

The position of the end of the finger 50 on this axis can then be determined as the projection onto this axis of the point of the three-dimensional model furthest from the palm. In general, the ergonomics of the sensor makes it possible to know unambiguously on which side the palm is situated, otherwise the latter may also be partially imaged by the system or will be situated on the side where the finger is intersected by the edge of the sensor.

In order to determine the relative positions of the end of the finger 50, the crown 56 and the core 54, the position means 111 proceed for example by projecting the position of the core 54 onto the three-dimensional model.

The first checking means 113 can thus check that the crown 56 is indeed situated between the end and the core 54, which constitutes the relative positions expected. Furthermore, the first checking means 113 check also that the crown 56 of the dome, the end of the finger 50 and the core 54 are aligned on the 2D image of the phalanx, or at least that for two of three lines passing between three points taken in pairs among the crown 56, the end and the core 54, the angle is at the most 5°.

In order to determine the distance between the crown 56 of the three-dimensional model and the core 54, and the distance between the end of the finger 50 and the core 54, the calculation means 110 proceed for example by projecting the position of the core 54 onto the three-dimensional model or conversely by projecting the position of the dome and the end of the finger 50 onto the image of the fingerprint.

The capture system 102 may be any contactless system suitable for capturing a bidimensional image 52 of the fingerprint 51 and one or more images of the finger 50, allowing subsequent construction of a three-dimensional model of said finger 50.

It may for example be a case of one or more capture means, such as cameras or CCD or CMOS sensors. Other means can also be envisaged, such as for example a camera functioning on the principle of flight time, or on a method using ultrasound The document entitled "High-Resolution Structured Light Range Scanner with Automatic Calibration" written by A. M. BRONSTEIN et al. and published on 4 Aug. 2003 presents, in the context of a facial analysis that can be applied in the case of a finger, steps of approximating the three-dimensional surface of a sight and a step of applying the captured image of the face to the three-dimensional surface thus approximated.

The capture system 102 can then comprise the means necessary for such an application, such as for example a sight projector.

The acquisition means 104 are for example software means that construct a three-dimensional model of the finger 50 from the captured images. The three-dimensional model comprises, in the case of an authentic finger, at least one local dome representing the interior face of the last phalanx of the finger 50.

The location means 108 determine the location of the crown 56 of the dome of the three-dimensional model, for example by determining the point on the dome having the maximal average curvature. The curvature is chosen in such way of being positive on a convex part of the finger. The average curvature is defined for example on the site wikipedia.org under "Courbure," and the main curvatures are defined for example in page 24 (definition 22) of the work "Courbes and Surfaces" of Boris Thibert.

Preferentially, beforehand, the surface will have been smoothed not to take into account the relief of the crests, typically by deleting all the reliefs of a scale smaller than 1 mm. As the extremity of the finger is a local maximum of curvature, it must be determined in first and the search for the dome excludes a zone of 3 mm around the extremity of the finger.

The determination means 106 determine the core by analysing the curvatures of the valleys and ridges visible on the image 52.

Mention can be made for example of the document "A Novel Method for Fingerprint Core Point Detection" by Johal, Navrit Kaur and Amit Kamra, published in International Journal of Scientific & Engineering Research 2.4 (2011), and the document "Singular point detection in fingerprint image" by Zhang, Weiwei, and Yangsheng Wang published in The 5th Asian Conference on Computer Vision (2002).

The calculation means 110 calculate the distance between the crown 56 of the three-dimensional model representing the finger 50 and the core 54 of the fingerprint 51. The calculation means 110 calculate also the distance between the end of the finger 50 and the core 54.

FIG. 3 shows a checking method 300 used by the checking device 100 and intended to check the authenticity of the fingerprint 51 of the finger 50.

The checking method 300 is implemented by the checking device 100 and comprises:

a capture step 302 during which the capture system 102 captures at least one image of said finger 50 and of said fingerprint 51, an acquisition step 304 during which the acquisition means 104 acquire a three-dimensional model of the finger 50, a determination step 306 during which the determination means 106 determine the core 54 on the image 52 of the fingerprint 51, an orientation step 309 during which the orientation means 109 determine the orientation and position of the end of said finger 50 from the captured images or from the three-dimensional model, a location step 308 during which the location means 108 locate the crown 56 of the three-dimensional model, a position step 311 during which the position means 111 determine the relative positions of said end, said crown 56 and said core 54, a first checking step 313 during which the first checking means 113 check that the relative positions thus determined are in accordance with those expected, a calculation step 310 during which the calculation means 110 calculate the distance between the crown 56 of the three-dimension model thus located and the core 54 thus determined, and the distance between the end of the finger and the core 54 and the ratio of the distance between the end of the finger 50 and the core 54 on the distance between the crown 56 and the core 54, a second checking step 312 during which the second checking means 112 check that the distance between the crown 56 and the core 54 thus calculated is in the first predefined range, a third checking step 312b during which the third checking means 112b check that the ratio thus calculated is in the second predefined range, and a first decision-taking step 314 during which the first decision-taking means 114 take a decision as to the authenticity of the fingerprint 51 from information transmitted by the first checking means 113 and the second checking means 112 and the third checking means 112b after respectively the first checking step 313, the second checking step 312 and the third checking step 312b.

The first predefined range and the second predefined range are determined so as to take account of the detection precision that it is wished to obtain. The first range and the second range may be adjusted by learning on a database of real fingers, adjusting for a predetermined rejection rate, for example 1%.

The acquisition step 304 may consist of a reconstruction of the three-dimensional model of the finger 50 from the captured images.

It may happen that the finger 50 has a relatively irregular relief or has a plurality of domes, and the location step 308 may then fail to locate a crown 56. Likewise some frauds carried by moulding a finger do not have a dome, but a characteristic hollow in its place.

The checking method 300 then continues with a prediction step 316 during which prediction means 116 of the checking device 100 determine a zone liable to contain said crown 56 from the position of the core 54 determined by the determination means 106 and the orientation of the finger determined by the orientation means 109, and then a test step 318 during which test means 118 of the checking device 100 calculate the curvature of said zone which is defined as the average on said zone of the average curvature of the surface of the finger 50 and test whether this curvature is in a third predefined range, and then a second decision-taking step 320 during which second decision-taking means 120 of the checking device 100 take a decision as to the authenticity of the fingerprint 51 from information transmitted by the test means 118 after the test step 318.

The zone thus determined is situated between 1 and 3 mm from the core 54 towards the end of the FIG. 50.

In particular, the third range is defined so as to check that the curvature of said zone is such that the zone does not have a hollow.

Typically, the average on said zone of the average curvature must be slightly positive. Typically, the third range lies in the positive values.

In other words, if the average on said zone of the average curvature is not included in the third predefined range, the finger 50 and the fingerprint 51 will be considered to be false and if the average on said zone of the average curvature is included in the third predefined range, the finger 50 and the fingerprint 51 will be considered to be true.

In the absence of detection of a dome and its crown 56 in the expected zone for its presence, the presence of a hollow is therefore also characteristic of a fraud.

The checking method 300 may be used as a single checking method, but is preferentially used with other checking methods and serves to consolidate the decisions of these other checking methods.

Classically, the checking devise 100 comprises a processor or CPU; a random access memory RAM; a read-only memory ROM.

The determination means 106, the location means 108, the orientation means 109, the positioning means 111, the first checking means 113, the calculation means 110, the second checking means 112, the third checking means 112b, the first decision-taking means 114, the prediction means 116, the test means 118, and the second decision-taking means 120 are realized by the processor.

Naturally the present invention is not limited to the examples and embodiments described and depicted here, but is capable of numerous variants accessible to a person skilled in the art.

The invention claimed is:

1. A checking device intended to check the authenticity of a fingerprint of a finger of a person, the checking device comprising:
   a capture system intended to capture without contact at least one image of said finger and of said fingerprint, and circuitry adapted to:
   acquire a three-dimensional model of the finger;
   determine a core on the image of the fingerprint;
   determine orientation and position of an end of said finger;
   locate a crown of the three-dimensional model;
   determine relative positions of said end, said crown and said core;
   perform a first check, checking that the relative positions of the core, of the crown and of the end of the finger thus determined are in accordance with those expected;
   calculate a distance between the crown of the three-dimensional model thus located and the core thus determined;
   perform a second check, checking that the distance between the crown and the core thus calculated is in a first predefined range; and
   take a decision as to an authenticity of the fingerprint from information resulting from the first and the second check.

2. The checking device according to claim 1, wherein the circuitry is also adapted for:
   calculating a distance between the end of the finger and the core and a ratio of the distance between the end of the finger and the core to the distance between the crown and the core; and
   performing a third check, checking that the ratio thus calculated is in a second predefined range, the decision as to the authenticity of the fingerprint also using information resulting from the third check.

3. The checking device according to claim 1, wherein the circuitry is also adapted for:
   determining a zone liable to contain said crown from the position of the core determined;
   performing a first test calculating a curvature of said zone and testing whether the curvature is in a third predefined range, where the curvature of said zone is an average on the zone of an average curvature of the surface of the finger; and
   taking a decision as to the authenticity of the fingerprint from information resulting from the first test.

4. A checking method intended to check the authenticity of a fingerprint of a finger of a person comprising:
   capturing at least one image of said finger and of said fingerprint;
   acquiring without contact a three-dimensional model of the finger;
   determining a core on the image of the fingerprint;
   determining the orientation of the finger and position of the end of said finger;
   locating a crown of the three-dimensional model;

determining the relative positions of said end, said crown and said core;

performing a first check that the relative positions thus determined are in accordance with those expected;

calculating the distance between the crown of the three-dimension model thus located and the core thus determined and the distance between the end of the finger and the core and the ratio of the distance between the end of the finger and the core to the distance between the crown and the core;

performing a second check that the distance between the crown and the core thus calculated is in a first predefined range;

performing a third check that the ratio thus calculated is in a second predefined range; and taking a decision as to the authenticity of the fingerprint from information resulting from the first check, the second check and the third check.

5. The checking method according to claim 4, further comprising:

determining a zone liable to contain said crown from the position of the core determined and the orientation of the finger;

performing a first test comprising calculating the curvature of said zone and testing whether this curvature is in a third predefined range; and taking a decision as to the authenticity of the fingerprint from information resulting from the first test.

* * * * *